(12) United States Patent
Shi et al.

(10) Patent No.: US 9,253,995 B2
(45) Date of Patent: Feb. 9, 2016

(54) JUICER WITH SOYMILK GRINDING FUNCTION

(75) Inventors: Zhenyu Shi, Guangdong (CN); Jiang Chen, Guangdong (CN); Haihui Peng, Guangdong (CN); Dongchuan Xing, Guangdong (CN); Zhijian Ma, Guangdong (CN)

(73) Assignee: GUANGDONG XINBAO ELECTRICAL APPLIANCES HOLDINGS CO., LTD, Guangdong (CN)

( * ) Notice: Subject to any disclaimer, the term of this patent is extended or adjusted under 35 U.S.C. 154(b) by 316 days.

(21) Appl. No.: 13/812,864

(22) PCT Filed: Jul. 28, 2011

(86) PCT No.: PCT/CN2011/077710
§ 371 (c)(1),
(2), (4) Date: Jan. 28, 2013

(87) PCT Pub. No.: WO2012/013150
PCT Pub. Date: Feb. 2, 2012

(65) Prior Publication Data
US 2013/0125768 A1 May 23, 2013

(30) Foreign Application Priority Data
Jul. 28, 2010 (CN) .......................... 2010 1 0240196

(51) Int. Cl.
*A23L 1/20* (2006.01)
*A47J 19/02* (2006.01)
*A23C 11/10* (2006.01)

(52) U.S. Cl.
CPC ............. *A23L 1/2006* (2013.01); *A47J 19/025* (2013.01); *A23C 11/103* (2013.01)

(58) Field of Classification Search
CPC ........... A47J 19/00; A47J 19/02; A47J 19/04; A47J 19/06
USPC ............ 99/510, 513, 501, 502; 100/117, 131, 100/133, 134, 135, 145
See application file for complete search history.

(56) References Cited

U.S. PATENT DOCUMENTS

| | | | | |
|---|---|---|---|---|
| 3,998,148 A | * | 12/1976 | Mainka et al. | 100/117 |
| 4,160,732 A | * | 7/1979 | Maffet | 210/808 |
| 4,429,626 A | * | 2/1984 | Ihara et al. | 99/510 |
| 6,796,220 B2 | * | 9/2004 | Lee | 99/348 |
| 2006/0157602 A1 | * | 7/2006 | Wang | 241/152.2 |
| 2009/0049998 A1 | * | 2/2009 | Kim | 99/510 |

FOREIGN PATENT DOCUMENTS

| | | | |
|---|---|---|---|
| CN | 2542178 Y | * | 4/2003 |
| CN | 101693627 A | * | 4/2010 |
| CN | 101766283 A | * | 7/2010 |

* cited by examiner

*Primary Examiner* — David Angwin
*Assistant Examiner* — John J Norton
(74) *Attorney, Agent, or Firm* — George G. Wang; Bei & Ocean (57) ABSTRACT

The present provides a soymilk machine/juicer with grinding function, comprising a pair of concentric rotator (13) and stator (14) that are vertically arranged in a house. There are at least two thread convex ribs (16) on said rotator (14), and the thread convex ribs (16) are evenly distributed on the outer surface of a rotator body (15). Rotary clearance is defined between the thread convex ribs (16) of the rotator (13) and the inner wall of the stator (14). The middle upper part of said rotator body (15) is a revolved portion with small upside and large downside. The clearance of the upside of the rotator body (15) corresponding to an upper filter net (17) on the stator (14) is largest, which is the smashing section for dealing with stuff after stuff is fed. The clearance of the middle part of the rotator body (15) corresponding to the middle upper part of an abrasive disc of the stator (14) is medium-size, which is for smashing stuff further. The clearance of the middle lower part of the rotator body (15) corresponding to the lower part of the abrasive disc of the stator (14) is gradually shortened to less than 1 mm, which is the grinding section for stuff. The part of the rotator (13) under the grinding section corresponding to a lower filter net (18) on the stator (14) is the separating section for the soymilk from residue. The rotator of said soymilk machine/juicer can rotate stably and have less noise, and stuff can be grinded to be finer.

7 Claims, 10 Drawing Sheets

FIG. 1

PRIOR ART

FIG.2

PRIOR ART

FIG.3

PRIOR ART

JUICER WITH SOYMILK GRINDING FUNCTION

CROSS-REFERENCE TO RELATED APPLICATIONS

This application claims priority from CN Application No. 201010240196.3, filed Jul. 28, 2010 and PCT Application No. PCT/CN2011/077710, filed Jul. 28, 2011, the contents of which are incorporated herein in the entirety by reference.

FIELD OF THE INVENTION

The present invention relates to a household soymilk machine/juicer, in particular, to a soymilk machine/juicer with a grinding function.

BACKGROUND OF THE INVENTION

The food processor, such as the soymilk machine, juicer/extractor, blender, etc, is an important category of household appliances. In recent decades, such food processors become popular in global market and loved by customers in China due to its convenience, speed and compatibility with the Chinese food. The core technology underlying the conventional soymilk machine, juicer, blender and other similar automatic food processors is of three major types as described below:
1. The food material is broken up by high speed rotation of metal blades. Conventional soymilk machines and food processors mostly belong to this type.
2. The food material is processed into small filaments or pieces by relative motion between the food material and a metal scraper which has numerous shaving holes (serves as small scraping blades) on the surface. The juice and residues are then separated by centrifugal force. The example is the scraper type juicer.
3. The food material is pushed into a small chamber by a screw rod and extruded through a metal mesh filter placed at opposing end of the chamber. Alternatively, the food material can be cut into small pieces by a set of blades which moves relative to each other for cutting the food material into small pieces and extracting the juice. The examples are screw rod type juicer and meat grinder.

The food processors of the first and second types have following drawbacks:
1. Metal blades may become rusted and blunt after repeated use.
2. Processed food material may stick to metal blades due to the heat generated on the metal blades during operation, making them difficult to clean. This is particularly troublesome for the soymilk machine with a heater as the food material is more easily sticking to the metal blades upon being heated.
3. Metal blades may become contaminated and produce abnormal odors due to bacteria growth in micro-pores on the surface of the metal blades, which can affect the flavor of the processed food material, affect food color due to chemical reaction upon contacting with the food material such as fruits, or even is detrimental to health due to the small amount of heavy metal elements released from the metal blades during blending and grinding operations.

Figure 1:
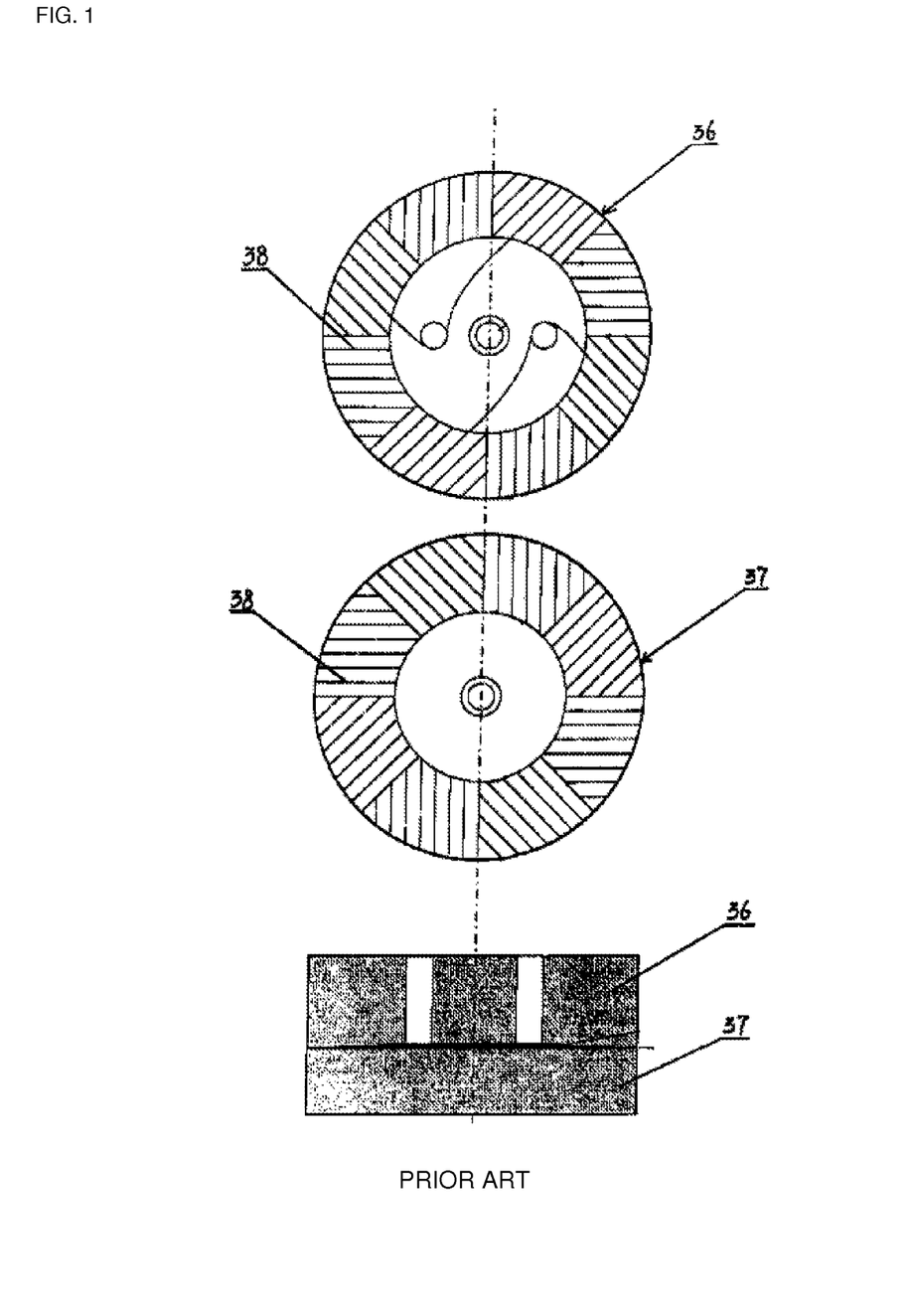
FIG. 1 is schematic view of an upper plate, a lower plate and assembled structure of a wet mill in the prior art.

The conventional automatic soymilk machines as described above are not really the same as the traditional way of making soymilk. In the traditional way, the soy beans are grinded manually using a stone mill. The stone mill can have various types such as wet mill, dry mill, oil mill or paste mill, etc. Among them, the wet mill is a traditional tool specifically for making soymilk. The soy beans to be processed are put between a pair of milling plates (including an upper plate 36 and a lower plate 37, see FIG. 1) after being soaked in water. Opposing surfaces of the upper and lower plates 36 and 37 both have milling teeth 38 in peripheral regions along radial directions. The length of milling teeth 38 of the upper plate 36 smaller than that of the milling teeth of the lower plate 36. The milling teeth 38 can have an arrangement of eight divisions each with eight teeth (as shown in FIG. 1). Alternatively, the milling teeth 38 can have other arrangements such as ten divisions each with four teeth or ten divisions each with six teeth depending on the need of the specific circumstance. Water is added through the feeding inlet while the milling plates rotate, and the soy beans are pressed by the pair of milling plates and grinded by the milling teeth due to relative movement of the two milling plates. The process then yields soymilk. During such milling process, the soy beans are under a variety of actions such as crushing, pressing, tempering, rubbing, twisting and grinding, which makes soymilk rich in flavor and taste good.

It has been found that the low rotation speed of the stone mill is directly related to the richness in flavor of the soymilk produced in the traditional way. Traditional manpowered stone mill operates at a rotational speed of 4-7 rpm. During such low speed process, the protein in the soymilk is sufficiently exposed to the air and thus fully oxidized. The slower the rotation speed is, the richer the flavor of the soymilk would be. This is why the soymilk made by the traditional stone mill has rich aroma and flavor. In addition, the soymilk is filtered with cotton cloth to remove finer residual powders particles and is thus tender and smooth with great taste.

In comparison, most of conventional existing soymilk machines employ a blending process of the first type mentioned above, in which the soy beans are broken or beat up into small pieces, and they are blended and heated at the same time. As such, the traditional milling process is replaced by a simple pulverization and crushing process in such soymilk machines. Therefore a large amount of bean residual powders are kept in the soymilk. In addition, the rotational speed of the blades in the soymilk machine (over 10,000 rpm) is much greater than the rotational speed of a traditional stone mill, which can destroy some nutrients in the soymilk and thus lower the extraction rate of bean nutrients. The soymilk made by such soymilk machine is drastically different from the soymilk made by the traditional stone mill in terms of flavor, taste and nutrient level. In other words, the traditional stone mill produces better soymilk. Furthermore, the soymilk machine of the first type does not have a separation step for separating soymilk and residuals. The resulting soymilk contains both the milk and residuals, which not only affect taste but also affect absorption of nutrient ingredients by the human body. In addition, those conventional soymilk machines vibrate due to the high speed rotation, which in turn generates unpleasant noises.

Figure 2:
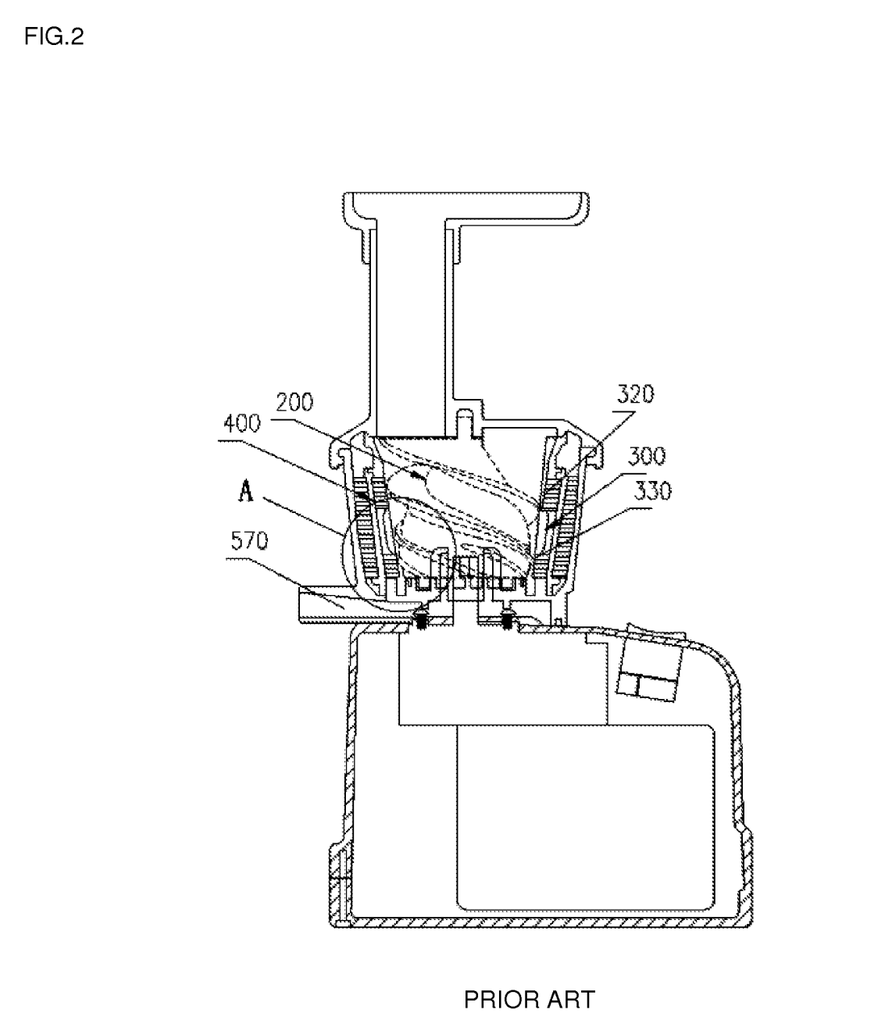
FIG. 2 is a sectional schematic view of a juicer in the prior art.
Figure 3:
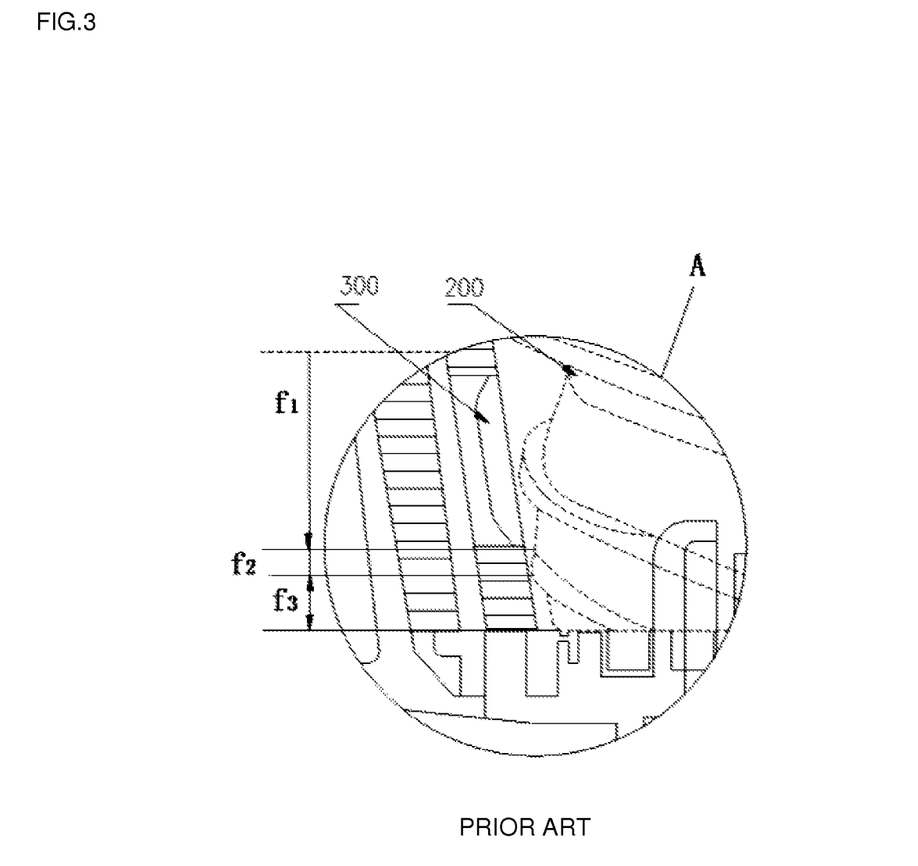
FIG. 3 is an enlarged view of region A in FIG. 2.

The soymilk machine of the third type is rare, but Chinese patent application No. 200780001269.X entitled "JUICER" discloses a soymilk/juice machine of such type. As shown in FIGS. 1 and 2 therein (corresponding to FIGS. 2 and 3 in the present application, respectively), the juice machine includes a screw rod 200 and a meshed can 300, installed vertically in a concentric nesting manner. The height of the screw thread on the surface of the screw rods 200 decreases from top to bottom. There is a grinding plate disposed on the inner surface of the meshed can 300. The food material enters the gap between the meshed can and the threads of the screw rod from above. The food material in the gap is then squeezed and crushed by rotating the screw rod and the juice generated during the process flows through the meshed can via the mesh filters disposed at the upper and lower positions (which are straining mesh 320 and squeezing mesh 330 respectively) and is discharged from the juice outlet, and the residuals are discharged via residual outlet 570.

The juicer described as above has following drawbacks: since the screw rod is shaped like a loom shuttle, with two smaller ends and a bigger midsection, which makes it impossible to provide a grinding section at the lower end below the middle pulverization section. The gap between the screw rod and meshed can of a profile like "K." has an upper section f1 for guiding and breaking, which has a greater gap size. The middle section f2 is for pulverization with a smaller gap, and a lower section f3 for juice/residual separation with a slightly increased gap. As the outer surface of the screw rod and the inner surface of the meshed can assume a "K" profile, the device lacks a grinding section to perform a grinding process like the traditional stone mill which requires two generally parallel opposing grinding surfaces. The gap in section f1 is decreased gradually from top to bottom and reaches a minimum at the pulverization section f2. The food material goes through the stages of guiding, breaking, pulverization and eventually enters into a juice/residual separation section. The juicer processes the food material by squeezing and crushing, unlike the grinding process in the conventional manpowered milling. Therefore, although the screw rod rotates slowly, the flavor and taste of the soymilk is still drastically worse than the soymilk made by the traditional stone mill approach due to the lack of the grinding process. In addition, since the food material is not grinded, the food material has bigger particle sizes, which can readily get stuck in the filter mesh of the mesh can and need to be brushed off into the milk by the rotating brush 400. Otherwise, the filter mesh will be blocked, affecting soymilk throughput. This will also increase the powder contents of the soymilk and affect the tenderness and smoothness of the soymilk.

SUMMARY OF THE INVENTIONS

One object of the present invention is to provide a soymilk machine/juicer with a grinding function, which has a simple structure and produces a juice which retains the flavor of the food material and has a smooth and tender taste with rich nutrient contents. The soymilk machine/juicer can achieve the grinding effect of a traditional stone mill, and process the food material with a combination of various actions such as crushing, pressing, tempering, rubbing, twisting and grinding, resulting in a better juice.

The above object of the present invention is achieved by the following technical solution: a soymilk machine/juicer with a grinding function, comprising an upper body and a lower body including a driving device therein. The upper body includes a housing, an upper lid and a rotor-stator pair installed vertically within the housing. The rotor is inserted into the stator and includes a rotor body, screw threads distributed on outer surface of the body, and a driving connection device connected to the driving device in the lower body. The stator has two ring shape filters at both upper and lower portions, respectively, and between the two filters there are vertical grinding plates disposed on the inner wall of the stator. The base of the housing has a juice discharging outlet and a residual discharging outlet. There are at least two screw threads distributed evenly on the body of the rotor, and there is a rotating gap between the screw threads of the rotor and the inner wall of the stator. The body of the rotor has an upper portion of rotational symmetry with an increasing diameter from top to bottom, so that the rotating gap between the rotor and the stator is gradually decreased in size from top to bottom. The gap is the biggest in the breaking section for processing a food material at the upper portion; the gap is medium-sized in the pulverization section for further comminuting the food material in the middle portion; and the gap reach its minimum size of about 1 mm in the grinding section in the lower portion. Additionally, a juice/residual separation section is located below the grinding section. With a slow speed of rotation of the rotor within the stator, the food material is subjected to guiding, breaking, pulverization, grinding and separation as it moves down from top to bottom of the gap between the rotor and stator. At the end, the juice is produced and discharged.

In the present invention, the screw threads are evenly distributed on the body of the rotor so that the rotor can rotate stably. Since the rotor operates at a low speed of less than 100 rpm, it does not vibrate and thus the noise is greatly reduced. The food material is subjected to guiding, breaking, pulverization, grinding and separation stages, in which the grinding process is similar to the traditional stone mill process and, can grind the food material into finer particles and produce a juice with rich flavor, smooth taste and greater nutrient contents for improving the absorption rate of the nutrient contents by the human body upon being ingested.

Furthermore, as the grinding process is similar to the traditional stone mill process, the resulting juice is smoother and the filters of the stator can be kept clear (i.e., not being blocked by the residues) so that the throughput can be maintained without needing the rotating brush as used in the prior art.

As a preferred embodiment of the present invention, the grinding gap, which is between the middle portion of the rotor and the lower portion of the grinding plate of the stator, has a width D between 0.5 mm and 0.8 mm and a length L3 between 10 mm and 25 mm.

Preferably, a rotor nano-ceramic ring made of nano-ceramic materials is formed on the outer surface of the rotor in the grinding section, and a stator nanometer ceramic ring made of nano-ceramic materials is formed correspondingly on the inner surface of the stator, so that the food material is grinded at a low speed in the grinding gap between the rotor nano-ceramic ring and the stator nanometer ceramic ring. The nano-ceramic material has advantages such as no micropores, high density without heavy metal elements (such as nickel and chrome), acid and base resistance, no rusting, no chemical reactivity with the food, no harmful precipitation, and low sorption of food materials, which can facilitate preserving the food flavor, enable easy cleaning and suppress bacteria growth and is beneficial to health under long term use. In addition, the hardness and wear resistance of the ceramic is much greater than the conventional metal material with long term stability and high recycling rate, which can effectively improve service life of the device and reduce environmental pollution when the device is disposed.

As an embodiment of the present invention, the rotor comprising an upper rotor, a rotor nano-ceramic ring and a lower rotor. The rotor nano-ceramic ring is located in a ring installing groove formed at the edge portion on the upper surface of the lower rotor. The upper rotor is integrally connected to the top of the lower rotor.

As an embodiment of the present invention, the housing of the upper body is of a can shape. The upper lid is disposed at the top of the housing and has an inlet. The rotor has a center rotating shaft, which has an upper end kept in position by the upper lid. The inlet is offset relative to the rotating shaft, and is connected to the gap between the rotor and the stator through the screw threads of the rotor.

In order to prevent the juice from leaking into the connection device between the rotor and the driving device, which may induce bacteria growth or rusting of the metal components, the present invention adopts a watertight structure on the base of the housing. Based on the principle that water always flows to a lower level, the watertight structure adopts a shape like a mesa at the central portion of the base of the housing, and its flat top is at a level higher than the plane on which the bottom surface of the rotor touches the base of the housing. The mesa-like structure (or the "mesa" hereinafter) has a through hole at the center to allow the driving connection device to pass through, and a recess with a shape matching the mesa is correspondingly formed at the bottom surface of the rotor so that the mesa well fits in the recess. There is at least one sealing member disposed between the mesa and the recess. For example, the sealing member can be a sealing ring which is a "U" shaped cross-section and is mounted on the inner wall of the central through hole of the housing. The sealing member can further prevent the juice from entering the gap between the through hole and the driving connection device.

As a further improvement, the mesa has at least one additional step along circumferential direction with a ring shape flange formed on the surface of the step serving as a further watertight structure. Correspondingly, there is a ring shaped groove on the lower surface of the rotor and the flange is engaged in the groove.

In order to further improve the water-tightness, a ring shaped guiding slot is formed at the edge of the base of the housing and a protruded guiding ring is formed at the edge of the bottom surface of the rotor, and the guiding ring is inserted into the guiding slot. The guiding slot and the guiding ring constitute an outer sealing means for preventing the juice from entering the gap between the rotor and the base of the housing.

As a particular embodiment of the present invention, the gap between the juice/residual separation section of the rotor and the filer at the lower portion of the stator is utilized for separating the juice and residuals, which is increased gradually from to bottom, thus forming a structure like a bell mouth.

The juice/residual separation gap of the present invention has a width H of between 1.0 mm and 2.0 mm (i.e., the distance between the outer wall of the rotor and the inner wall of the stator) and a length L4 between 10 mm and 25 mm.

The present invention has following technical effects over the prior art:
(1) The rotor has two or more screw threads evenly distributed on the body of the rotor so that the rotor can rotate stably, which reduces vibration and noises.
(2) With the addition of a grinding section with a gap less than 1 mm (located between a lower part of the rotor and the grinding plate of the stator) plus the gradual decreasing (from top to bottom) in the gap size between the upper part of the rotor and the stator, the food materials entering the processing chamber of the present invention go through not only the breaking section, the pulverization section, the juice/residual separation section, but also are subjected to a grinding process after pulverization. Such grinding process at a low speed is similar to a traditional stone mill grinding, which processes the food material with a combination of various actions such as crushing, pressing, tempering, rubbing, twisting and grinding, and can grind the food materials into finer particles for extracting more nutrient contents and improving the absorption rate of those nutrient contents by human body.
(3) Furthermore, due to the grinding process of the present invention, the juice is smoother and the filters of the stator can be kept clear for maintaining the throughput of the juice and residual without need to use the conventional rotating brush so that the present invention has a simpler structure compared with the prior art.
(4) The optional use of nano-ceramic materials at the grinding section of the rotor and stator can improve wear resistance, cleaning and suppression of bacteria growth and have lower sorption of food material. It can improve product quality and durability, control releasing of harmful elements form the metal blades, maintain long term stability and high recycling rate, enable easy cleaning, and reduce the environmental pollution when the product is disposed.
(5) The present invention can extract more nutrient contents form the food material, improve the taste and make the nutrient contents to be more easily absorbed by the human body. In sum, the product of the present invention has greater practicability, compatibility, and lower manufacturing costs, and it is easy to use and environmental friendly.

BRIEF DESCRIPTION OF THE DRAWINGS

The present invention will be described in detail with reference to the accompanying drawings and embodiments.

The various features of novelty which characterize the invention are pointed out with particularity in the claims annexed to and forming a part of this disclosure. For a better understanding of the invention, its operating advantages, and specific objects attained by its use, reference should be made to the drawings and the following description in which there are illustrated and described preferred embodiments of the invention.

DETAILED DESCRIPTION OF PARTICULAR EMBODIMENTS OF THE INVENTION

First Embodiment

Figure 4:
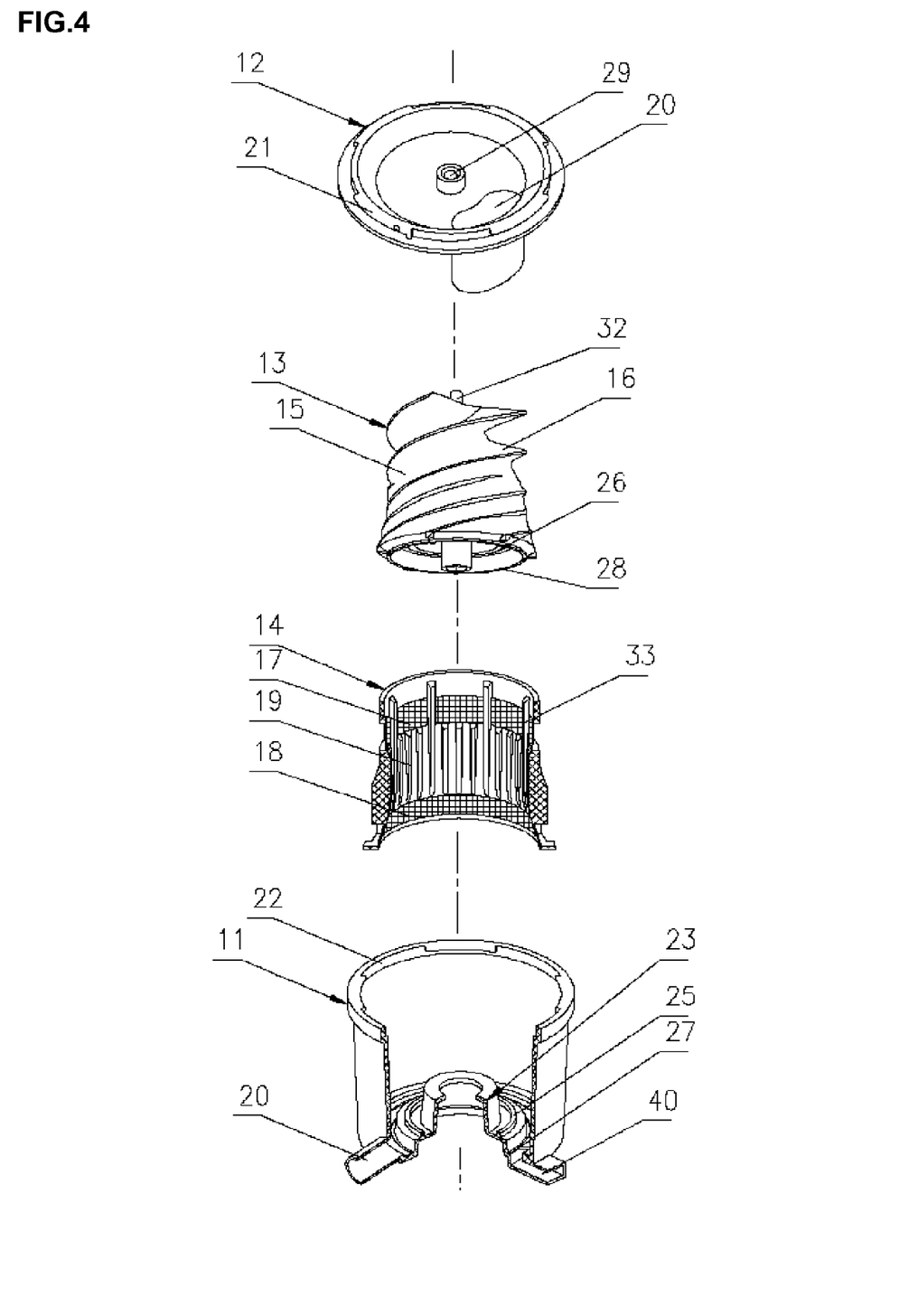
FIG. 4 is an exploded view of an upper body according to a first embodiment of the present invention.
Figure 5:
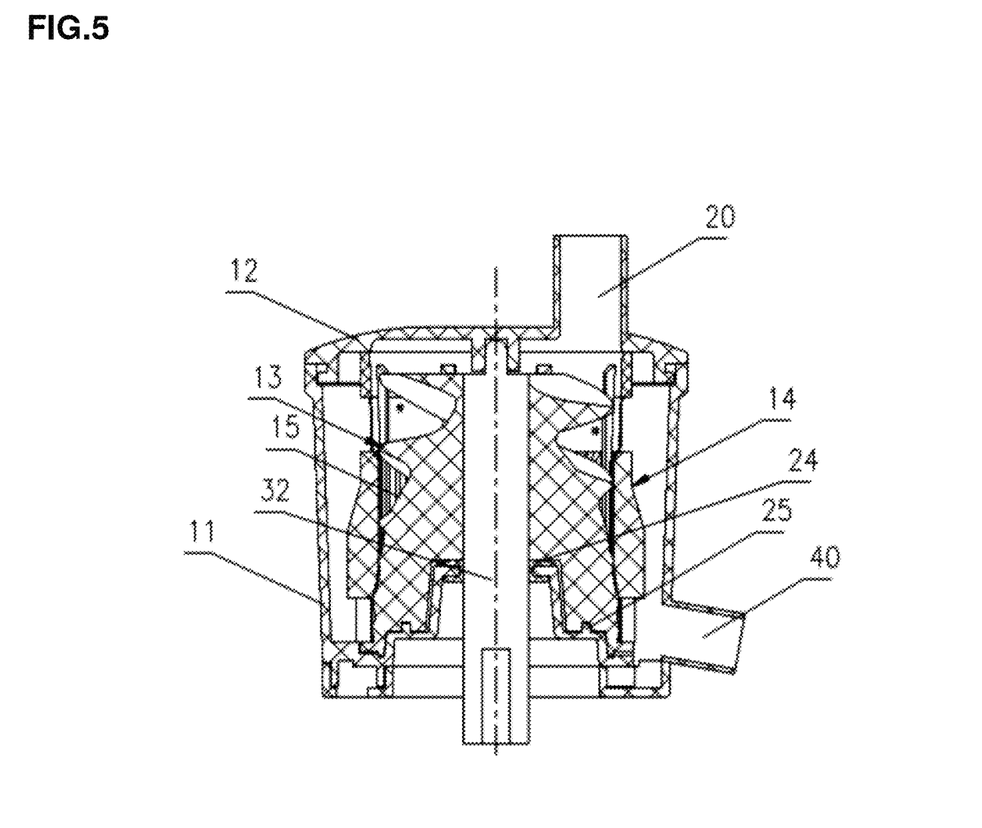
FIG. 5 is one sectional schematic view of the upper body according to the first embodiment of the present invention.
Figure 6:
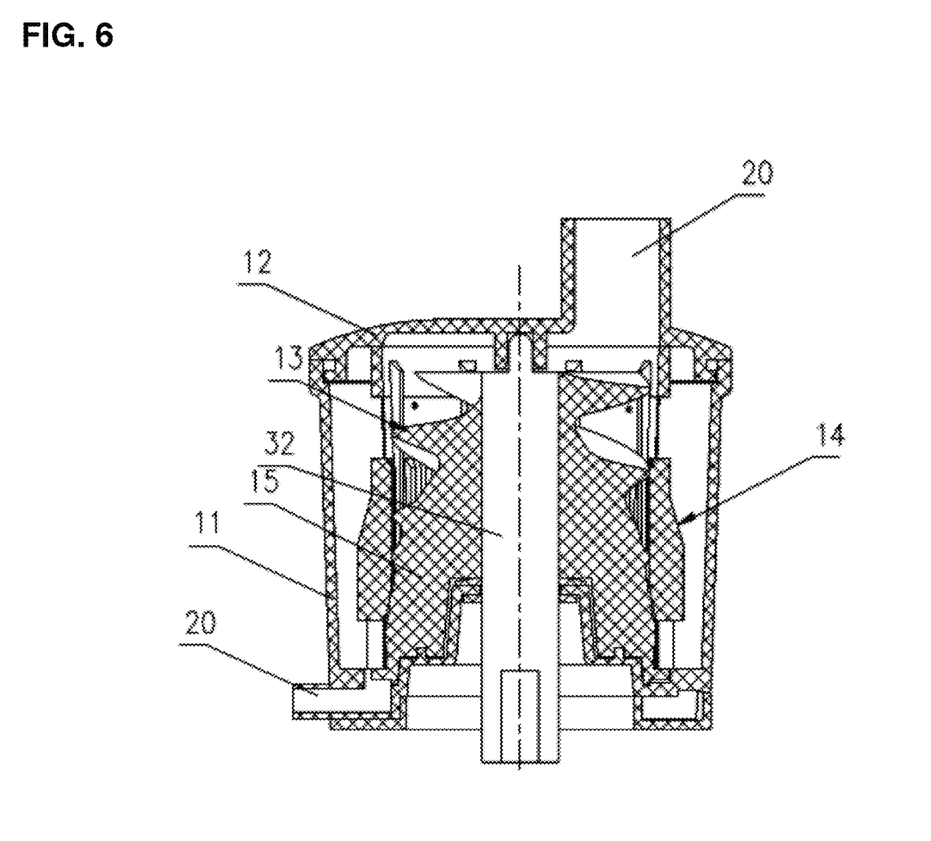
FIG. 6 is another sectional schematic view of the upper body according to the first embodiment of the present invention.
Figure 7:
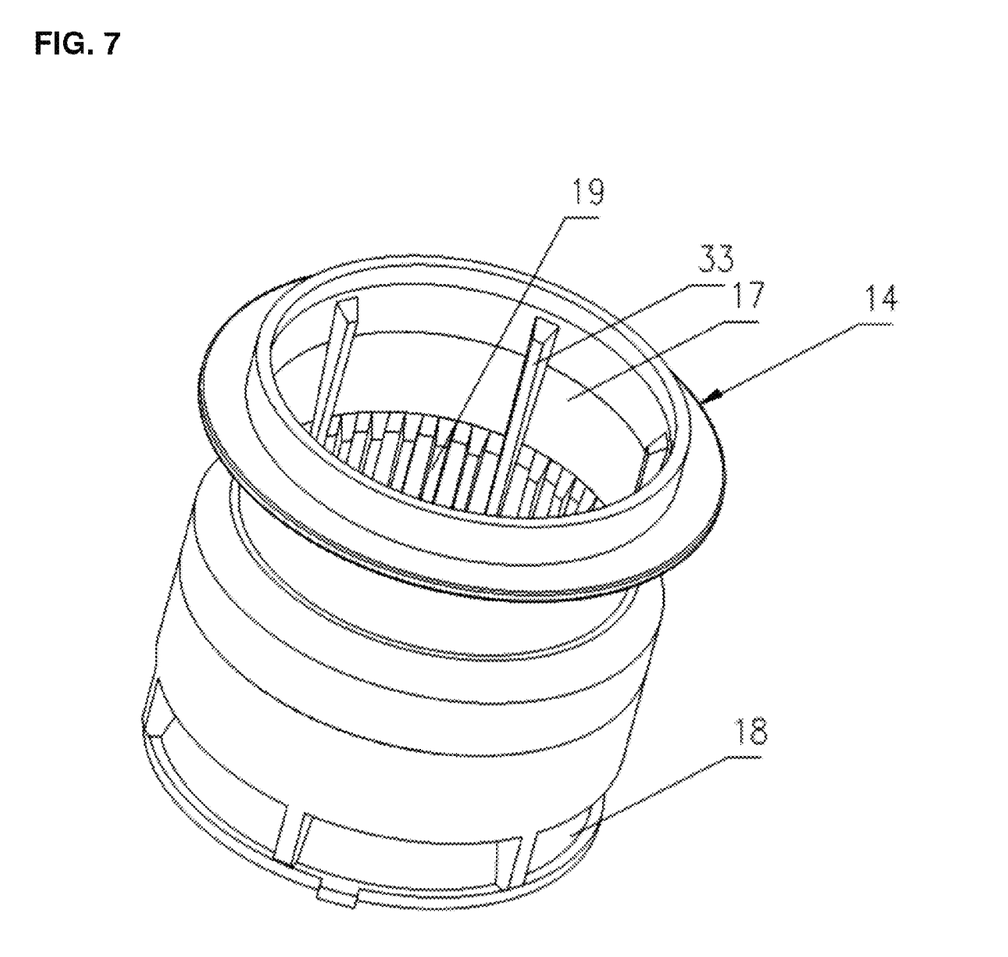
FIG. 7 is a schematic view of a stator.

As shown in FIG. 4-6, the soymilk machine/juicer with a grinding function according to the present invention comprises an upper body and a lower body (not shown). The lower body includes a driving device therein. The upper body includes a housing 11, a lid 12 and a concentric rotor 13 and a corresponding stator 14, installed vertically within the housing 11. The rotor 13 is inserted into the stator 14 and includes a rotor body 15, protruding screw threads 16 on outer surface of the body 15 and a connection device connected to the driving device. In this embodiment, the connection device is a rotating shaft 32 located at the central portion of the rotor 13.

The stator 14 has ring shape filters at both upper and lower portions, which are respectively a soymilk returning filter 17 and a juice/residuals separation filter 18. Vertical grinding plates 19 and vertical blades 33 are disposed on the inner wall between the soymilk returning filter 17 and juice/residuals separation filer 18; the base of the housing 11 have a juice discharging outlet 20 and a residual discharging out 40. In this embodiment, there are three screw threads 16 evenly distributed on the outer surface of the rotor body 15 of the rotor 13 and there is a rotating gap between the screw thread 16 of the rotor 13 and the inner wall of the stator 14. The rotor body 15 is a body of rotational symmetry with an increasing diameter from top to bottom, and therefore the rotating gap is the biggest at the upper section (L1). Section L1 is for processing the raw food material which is guided-in from the inlet, and located in the upper portion of the rotor body 15 and is corresponding to the upper soymilk returning filter 17 at the upper portion of the stator 14. The rotating gap at the pulverization section L2 is of a medium size (i.e., large than that of section L1 but smaller than that of section L3). Section L2 is for further comminuting the food material and located at a middle portion of the rotor body 15 and is corresponding to an upper-middle portion of the grinding plate 19 of the stator 14. The rotating gap reaches to its minimum size of about 1.0 mm at the grinding section L3, where the food material is subject to a combination of various actions such as crushing, pressing, tempering, rubbing, twisting and grinding. Section L3 is located in a middle portion of the rotor body 15 and is corresponding to a lower portion of the grinding plate 19 of the stator 14. Below the grinding section L3 is the juice/residual separation section L4, which is at the level of the lower juice/residual separation filter 18 of the stator 14. By a slow rotation of rotor 13 within stator 14, the food material is subjected to guiding, breaking, pulverization, grinding and separation as it moves down within the gap of varying sizes from the top to the bottom where the soymilk is eventually discharged.

The gap in section L3 is the grinding gap. The grinding gap is defined by the height of the screw threads 16, which is gradually decreased from top to bottoms. In this embodiment, the grinding gap at the grinding section has a width D of about 0.8 mm and a length L3 of about 25 mm. Because the grinding process in the grinding section is at a low speed, it is similar to a traditional stone mill, which processes the food material with a combination of actions such as crushing, pressing, tempering, rubbing, twisting and grinding. Therefore the food material particles can be grinded to finer particles, and thus more nutrient content can be extracted, which in turn increases absorption rate of the nutrient contents by the human body.

The gap in section L4 is for the juice/residual separation, with a gradually increased size from top to bottom, assuming a profile of a bell mouth. In this embodiment, the bell mouth has a straight vertical sidewall extending downwardly. The juice/residual separation gap has a length L4 of about 25 mm, a width H of about 2.0 mm and a residual discharging gap G of about 1.2 mm.

The housing 11 has a can shape. An upper lid 12 is disposed at the top of the housing 11 and has an inlet 20. The rotating shaft 32 at the central portion of the rotor 13 has an upper end positioned by the upper lid 12, that is, the upper end of the rotating end 32 is located in the positioning hole 29 of the upper lid 12. The inlet 20 is offset relative to the rotating shaft 32 of the rotor 13. The inlet 20 is connected to the gap between the rotor 13 and the stator 14 by the screw threads 16 of the rotor 13. The food material enters the gap from the inlet 20 in order to go through various processing stages.

The upper lid 12 and the housing 11 are connected by a movable connection means. In this embodiment, the movable connection means includes engaging talons 21 and engaging slots 22. The engaging talons 21 are spaced around the periphery of a lower surface of the upper lid 12, and the engaging slots 22 are spaced around the periphery of a top surface of the housing 11. The engaging talons 21 are engaged with the engaging slots 22 respectively.

A mesa 23 (see FIG. 4) is formed at the central portion of the base of the housing 11. The mesa is at a level higher than a plane on which a lower end of the rotor body 15 makes contact with the base of the housing 11. The mesa has a through hole at the center to allow the rotating shaft 32 of the rotor 13 to pass through. A recess hole with a matching shape is correspondingly formed at the bottom surface of the rotor 13 complementary to the profile of the mesa, so that the bottom surface of the rotor 13 matches with the base of the housing 11 (i.e., the mesa) with at least one sealing member disposed therebetween. The sealing member can be a sealing ring 24 with a U shaped cross-section (see FIG. 5) mounted at the inner wall of central through hole in the base of the housing 11. In this embodiment, the mesa 23 has an additional step along circumferential direction with a ring shape flange 25 formed on the step surface serving as a further watertight structure. Correspondingly, there is a ring shape groove 26 at the lower surface of the rotor 13 and the flange 25 is engaged in the groove 26. As shown in FIG. 4, a ring shaped guiding slot 27 is formed on the base of the housing 11 and correspondingly a protruded guiding ring 28 is formed at the edge of the bottom surface of the rotor 13. The guiding ring 28 can be inserted into the guiding slot 27.

Second Embodiment

Figure 8:
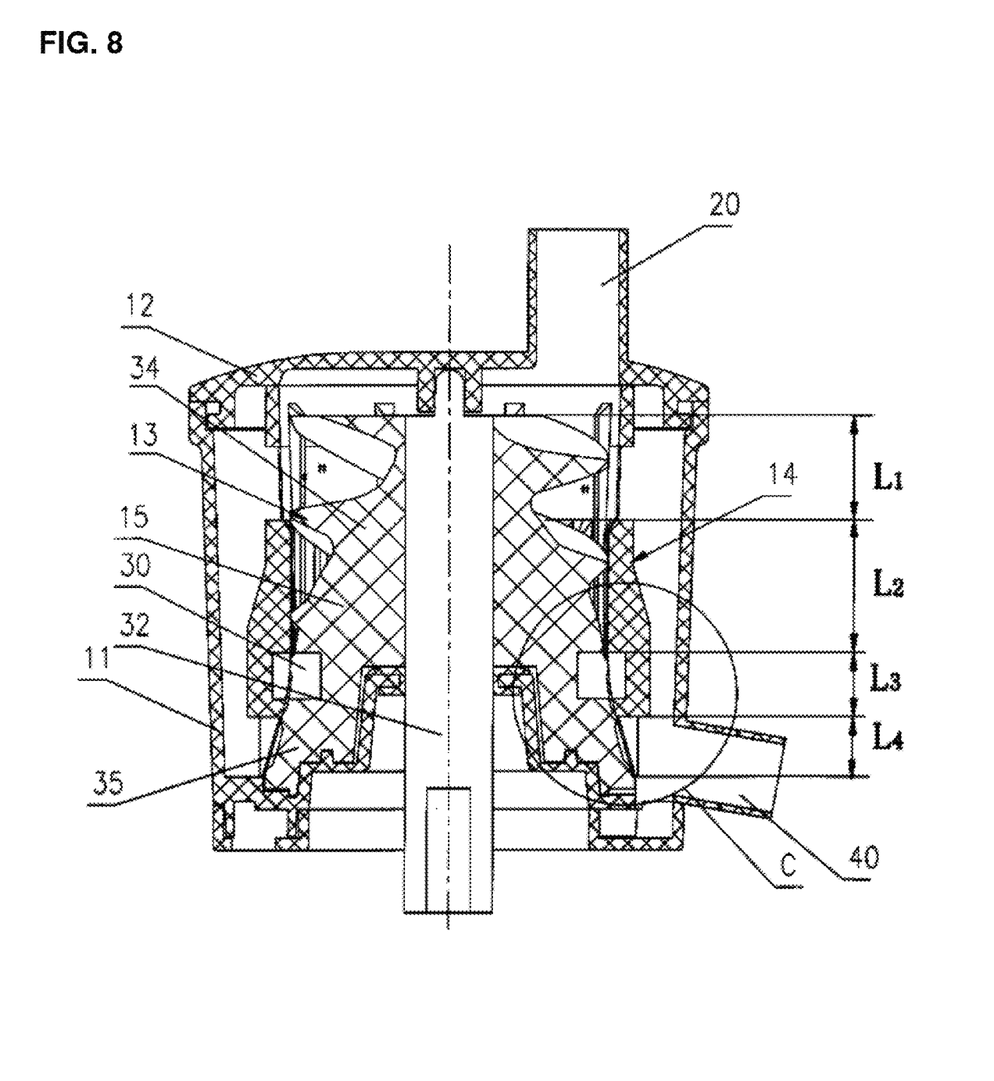
FIG. 8 is a sectional schematic view of the upper body according to a second embodiment of the present invention.
Figure 9:
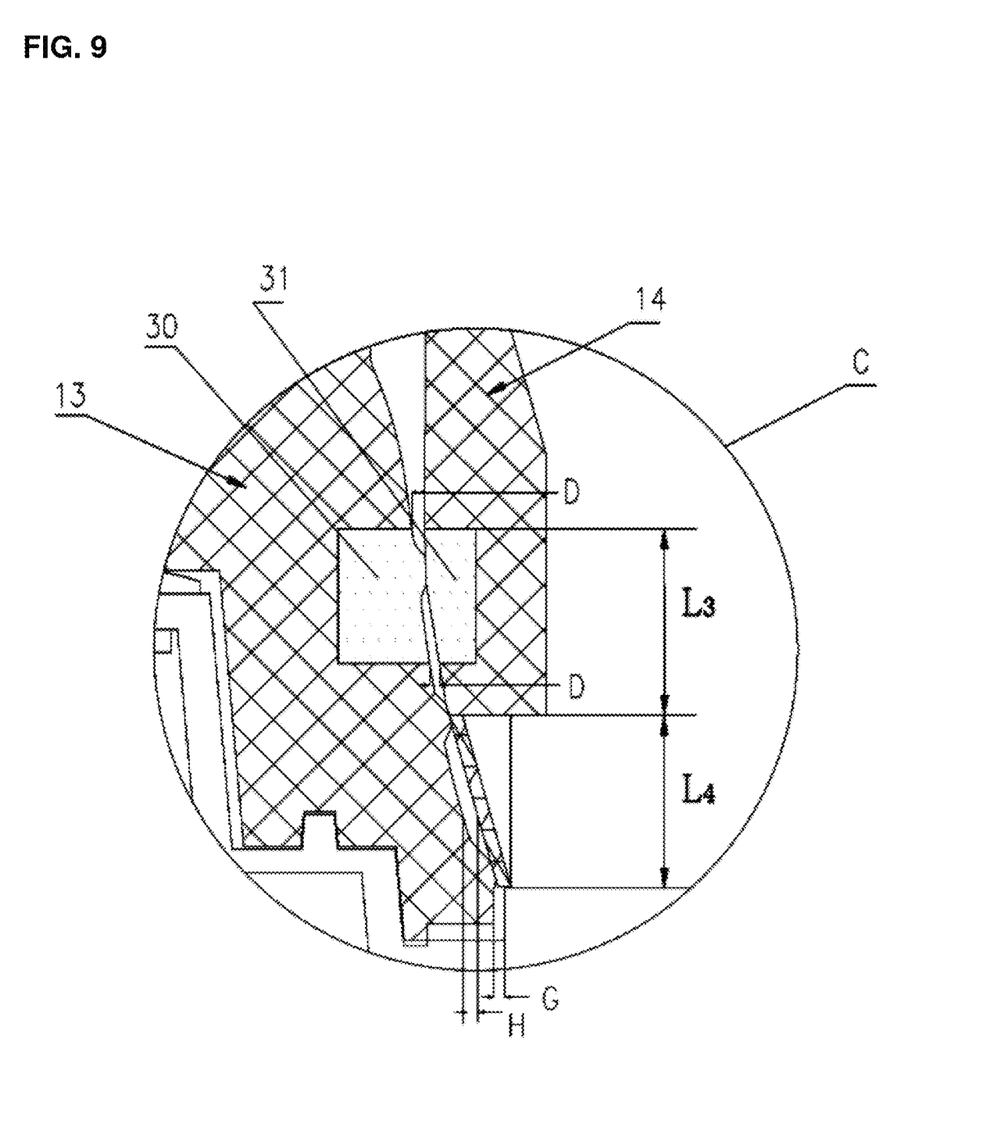
FIG. 9 is an enlarged view of region C in FIG. 8.
Figure 10:
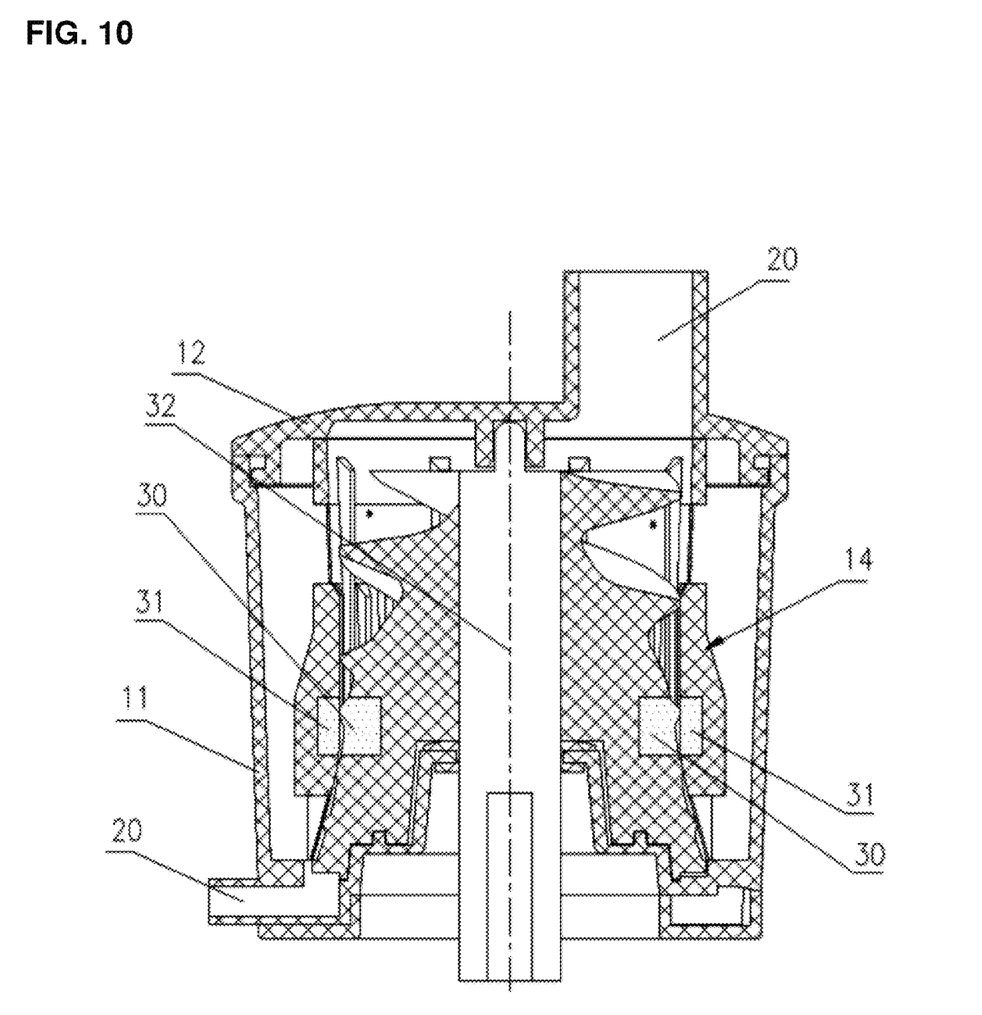
FIG. 10 is another sectional schematic view of the upper body according to the second embodiment of the present invention.

As shown in FIG. 8-10, this embodiment is different from the first embodiment in that: a rotor nano-ceramic ring 30 made of nano-ceramic materials is formed at the outer surface of the rotor 13 at the grinding section; and a stator nanometer ceramic ring 31 made of nano-ceramic materials is formed correspondingly at the inner surface of the stator 14, so that the food material can be grinded between the rotor nano-ceramic ring 30 and the stator nanometer ceramic ring 31 at a low speed.

The nano-ceramic material has advantages such as good wear resistance, easy for cleaning, resistance to bacteria growth and low sorption for food material, which can significantly improve the quality and durability of the product, suppress poisonous precipitation from the metal blades, enable long term stability, improve recycling rate, improve cleaning, and reduce environmental pollution when the product is disposed.

As shown in FIG. 8, the rotor 13 with the nano-ceramic ring is composed of an upper rotor 34, a rotor nano-ceramic ring 30 and a lower rotor 35. The rotor nano-ceramic ring 30 is located in a ring installing groove formed at the edge portion at upper surface of the lower rotor 35, which is integrated bonded to the upper rotor 34.

In this embodiment, the grinding gap has a width D of about 0.5 mm and a length L3 of about 10 mm. The bell mouth with ring shape cross section at the juice/residual separation section is inclined, that is, has a downward sloping. The juice/residual separation gap has a length L4 of about 10 mm, a width H of about 1.0 mm and a residual discharging gap G of about 1.5 mm.

Third Embodiment

This embodiment is different from the second embodiment in that: the grinding gap has a width D of about 0.7 mm and a length L3 of about 20 mm. The juice/residual separation gap has a length L4 of about 15 mm, a width H of about 1.5 mm and a residual discharging gap G of about 2.0 mm.

While there have been described and pointed out fundamental novel features of the invention as applied to a preferred embodiment thereof, it will be understood that various omissions and substitutions and changes, in the form and details of the embodiments illustrated, may be made by those skilled in the art without departing from the spirit of the invention. The invention is not limited by the embodiments described above which are presented as examples only but can be modified in various ways within the scope of protection defined by the appended patent claims.

What is claimed is:

1. A soymilk machine with a grinding function, comprising:
    an upper body and a lower body, said upper body comprising a concentric pair of rotor and stator that defines a gradually narrowing gap between an inner surface of said stator and an outer surface of said rotor along which a food material flows in a top-to-bottom configuration,
    said gap comprising a guided-in section, a pulverization section, a soy bean grinding section, and a separation section,
    said outer surface of said rotor comprising one or more threads distributed thereon, and said grinding section having a grinding gap and a length and a width suitable for grinding food material entering said grinding section while said rotor is in rotation, wherein
    said width of said grinding gap is defined by the radial height of said thread, said width being substantially in the range of 0.5-0.8 mm, and said length being substantially in the range of 10-25 mm.

2. The soymilk machine according to claim 1, wherein said outer surface of said rotor at said grinding section comprises a nano-ceramic ring made of a nano-ceramic material, and said inner surface of said stator at said grinding section comprises a nano-ceramic ring made of a nano-ceramic material.

3. The soymilk machine according to claim 1, further comprising a housing of a can shape, an upper lid disposed at the top of said housing and an inlet on said upper lid; said rotor has a rotating shaft at the central portion thereof, which has an upper end positioned by said upper lid; and said inlet is offset relative to said rotating shaft of said rotor and is connected to a gap between aid rotor and the stator.

4. The soymilk machine according to claim 3, wherein a mesa is formed at the central portion of a base of the housing, and a recess matching said mesa is formed on a bottom surface of said rotor, said mesa having a through hole at the center to allow a driving connection member to pass through.

5. The soymilk machine according to claim 1, wherein a ring-shaped guiding slot is formed at the edge of a base of said housing, a protruded guiding ring is formed at the edge of a bottom surface of said rotor, and said guiding ring is inserted into said guiding slot.

6. The soymilk machine according to claim 1, wherein said separation section assumes a shape of a bell on a vertical cross section and a shape of a ring on a horizontal cross section.

7. The soymilk machine according to claim 6, wherein said separation section has a gap of 1.0-2.0 mm in width and of 10-25 mm in length.

* * * * *